I. P. FRINK.
Reflector.
No. 3,826.
Reissued Feb. 8, 1870.
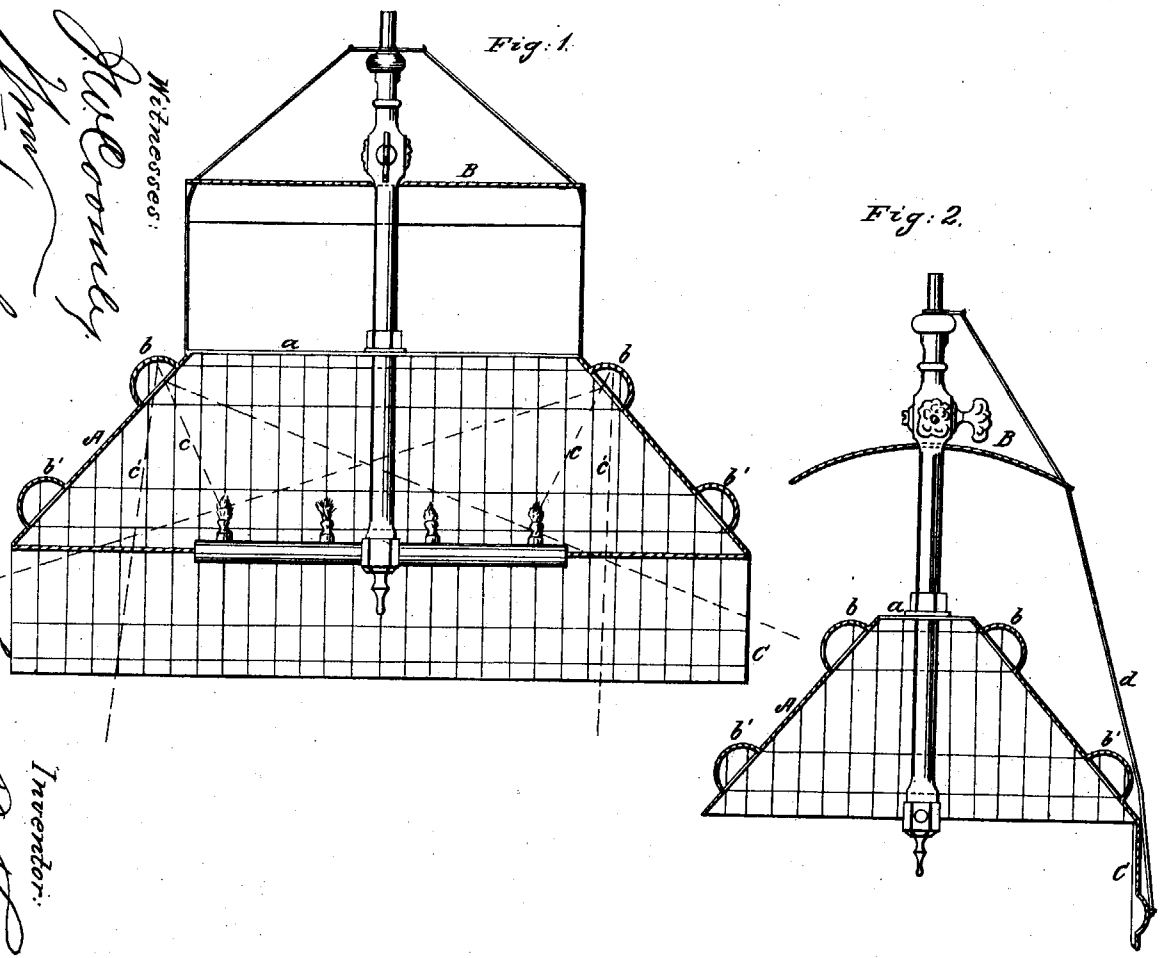
Witnesses:
J. W. Coomly
Wm. Tusch
Inventor:
Isaac P. Frink
N. PETERS, Photo-Lithographer, Washington, D. C.

UNITED STATES PATENT OFFICE.

ISAAC P. FRINK, OF NEW YORK, N. Y.

IMPROVEMENT IN REFLECTORS.

Specification forming part of Letters Patent No. 1,249, dated April 17, 1860; reissue No. 146, dated December 24, 1861; reissue No. 3,826, dated February 8, 1870.

DIVISION A.

*To all whom it may concern:*

Be it known that I, ISAAC P. FRINK, of New York, in the county and State of New York, have invented certain new and useful Improvements in Reflectors for Gas and other Lights; and I hereby declare that the following is a full, clear, and exact description thereof, reference being had to the drawing which accompanies and forms a part of this specification.

Of this drawing, Figure 1 is a longitudinal vertical section of one of my improved reflectors, showing a gas-pipe and burners in elevation; and Fig. 2 is an end or side transverse section of the same reflector taken at right angles to Fig. 1.

Similar letters in the two figures denote similar parts.

This improved reflector is designed for use in store-windows, public buildings, halls, railroad and ferry or steam-boat stations, churches, theaters, and all other places in which the space to be lighted is large, and in which the light is required to be thrown down below the burner or burners whence it proceeds, and to be widely diffused in all directions. To this end my invention consists in the employment, in reflectors in which the illuminating rays are thrown down below the source from whence they proceed, of a reflecting surface or series of reflecting surfaces arranged as hereinafter described, lined, covered, coated, or plated with either plain, corrugated, or figured glass, in combination with another reflecting surface placed above or over the first surface, with suitable space for the passage of air and for ventilation between the surfaces.

In the example of my improvement illustrated in the drawing, A represents the body of the reflector, which may be made of tinned sheet-iron, or of any other suitable material. It is lined or covered on the inside with glass, which may be either corrugated or plain or figured on its surface. In the reflector represented it is corrugated, which is the mode in which I prefer to construct it, for the reason that the corrugations, especially when they run up and down the glass, as shown, instead of horizontally on it, enable the illuminating rays to be very widely and abundantly diffused, so that a reflector provided with glass having such a surface will light up a much larger space than when the corrugations are not employed. This glass lining or covering constitutes the lower or first reflecting surface of my improvement, and it may be composed of a series of surfaces, as *x x x*, Fig. 2, extending horizontally around the inside of the body of the reflector. It will be seen that the body of the reflector shown in the drawing is that of a rectangular truncated pyramid. This form is especially intended for use in store-windows, and constitutes the subject of separate Letters Patent issued to me, of even date herewith; but any desired contour, whether circular, conical, or polygonal, may be given to the reflector, as its shape, as it is here described and claimed, is not material, and is designed to be varied to suit the particular situation in which it is placed, or the special purpose for which it is employed. In the upper part of the body of the reflector an aperture or opening, *a*, is made, which serves to provide the necessary passage for air through the reflector; but as some of the rays of light pass through this opening, I combine with the body A, which constitutes the first surface or series of surfaces of the reflector, a second reflecting-surface, shown at B, which is placed above the body, and intercepts and throws down nearly all the rays which would otherwise escape, being reflected by the body A, and would thereby fail of producing the best effect. This second reflecting-surface may be secured in position in any desired way, but it will be found convenient to suspend it by chains, wires, or cords from a support attached to the gas-tube, as shown in the drawing. The distance at which it should be located above the body or lower reflecting-surface A will depend upon the dimensions of the opening *a*, and upon the effect which it is desired the light shall produce. The relative distance illustrated in the drawing will, however, be found to answer well in practice. The outline of this upper reflecting-surface is not material, as it may be flat or curved. It is represented in the drawing as curved, and I prefer that it should be so, because when it is it will better reflect the rays of light through the opening *a*, thereby increasing the illumination below the reflector. In order still further to utilize all the illuminating rays, I may, if desired, provide the body of the reflector with the beads *b b*, which may be placed near the edges of the body, and may extend all around it, as shown. These beads will intercept and reflect back any rays which would otherwise tend to escape, without useful effect, over the edges of the body A, since such rays as are indicated at C, if they fell upon the surface of A, when the latter was not furnished with the beads, would be reflected in the direction of the dotted lines, while by providing the beads, they are thrown down in the direction of the lines *c*, and thus made to produce a useful effect. These beads, moreover, as well as the beads *b'* at the bottom of the lower reflecting-surface A, serve to stiffen the metal and strengthen the part A, and to give to the latter an ornamental appearance.

When my improved reflectors are used in store-windows, and it is desired to so control the effect of the light as to throw it to different portions of the window, I use with the reflector what I term a hinged section, which is represented at C. It may be made of the same materials as the part A, to which it may be hinged or otherwise attached, and I arrange it in such a manner that it can be adjusted to any desired angle by means of the chains *d*, or otherwise. If it be required to throw the light to the back portion of the window, the hinged section may be brought into a vertical or nearly vertical position. If it be wished to throw more light directly underneath the reflector, the hinged section is turned outward, so as to be brought into or nearly into line with that side of the part A to which it is attached. This hinged section tends to protect the eyes of persons looking into the window, and it can be added to the reflector without any essential increase of cost.

Having thus described my improvements, what I desire to secure by Letters Patent is—

1. In a reflector in which the illuminating rays are thrown down below the source from which they proceed, a reflecting-surface or series of reflecting-surfaces, as set forth, lined, covered, coated, or plated with either plain, corrugated, or figured glass, in combination with another reflecting-surface placed above or over the first surface, when suitable space is provided between the upper and lower surfaces for the passage of air and for ventilation, substantially as described.

2. The combination of the beads *b* and *b'*, or either of them, with the lower reflecting surface or series of surfaces, substantially as set forth.

3. The adjustable section, in combination with the lower reflecting-surface or series of surfaces, substantially as described.

4. The combination of the reflector, as described, with the adjustable section and the beads *b b'*, in the manner set forth.

ISAAC P. FRINK.

Witnesses:
T. B. BEECHER,
M. M. LIVINGSTON.